(12) United States Patent
Kuroda

(10) Patent No.: US 8,933,590 B2
(45) Date of Patent: Jan. 13, 2015

(54) ELECTRONIC CIRCUIT

(75) Inventor: Tadahiro Kuroda, Yokohama (JP)

(73) Assignee: Keio University, Tokyo (JP)

( * ) Notice: Subject to any disclaimer, the term of this patent is extended or adjusted under 35 U.S.C. 154(b) by 994 days.

(21) Appl. No.: 13/061,128

(22) PCT Filed: Aug. 4, 2009

(86) PCT No.: PCT/JP2009/003711
§ 371 (c)(1),
(2), (4) Date: Feb. 25, 2011

(87) PCT Pub. No.: WO2010/023825
PCT Pub. Date: Mar. 4, 2010

(65) Prior Publication Data
US 2012/0007438 A1 Jan. 12, 2012

(30) Foreign Application Priority Data

Aug. 26, 2008 (JP) .................................. 2008-216248

(51) Int. Cl.
*H03K 3/00* (2006.01)
*H03K 3/64* (2006.01)
(Continued)

(52) U.S. Cl.
CPC .......... *H04L 25/493* (2013.01); *H04L 25/0266* (2013.01); *H04L 25/40* (2013.01); *H04L 25/061* (2013.01)
USPC ............................ 307/106; 307/104; 307/105

(58) Field of Classification Search
None
See application file for complete search history.

(56) References Cited

U.S. PATENT DOCUMENTS 5,729,371 A 3/1998 Yoshida et al.
5,952,849 A 9/1999 Haigh
(Continued)

FOREIGN PATENT DOCUMENTS

JP H05-308244 11/1993
JP 08-023310 A 1/1996
(Continued)

OTHER PUBLICATIONS

D. Mizoguchi et al., "A 1.2Gb/s/pin Wireless Superconnect Based on Inductive Inter-Chip Signaling (IIS)", IEEE International Solid-State Circuits Conference (ISSCC 2004), Dig. Tech. Papers, pp. 142-143, 517, Feb. 2004.
(Continued)

*Primary Examiner* — Jared Fureman
*Assistant Examiner* — Aqeel Bukhari
(74) *Attorney, Agent, or Firm* — Miles & Stockbridge P.C.

(57) ABSTRACT

A low-power high-speed asynchronous inductive-coupling transmission and reception technology is provided, in which a current signal of a single pulse is made to flow through a transmitting coil, and a voltage signal of a double pulse induced in an inductively-coupled receiving coil can be received asynchronously. A transmitting circuit for performing non-contact proximity communication adopts a configuration in which current flows through a first coil in a first direction for each change of a logical value of transmit data. A receiving circuit connected to a second coil coupled inductively to the first coil employs a comparator which determines an induced voltage of a double pulse induced in the second coil by current in the first direction and outputs a unipolar single pulse signal. Whenever the single pulse signal outputted by the comparator is inputted, the receiving circuit inverts the output in a sequential circuit and reproduces receive data.

7 Claims, 11 Drawing Sheets

(51) Int. Cl.
*H01F 38/00* (2006.01)
*H01F 37/00* (2006.01)
*H04L 25/02* (2006.01)
*H04L 25/493* (2006.01)
*H04L 25/40* (2006.01)
*H04L 25/06* (2006.01)

(56) References Cited

U.S. PATENT DOCUMENTS

| 6,262,600 | B1 | 7/2001 | Haigh et al. | |
|---|---|---|---|---|
| 7,060,030 | B2 * | 6/2006 | Von Arx et al. | 600/300 |
| 2002/0017919 | A1 | 2/2002 | Haigh et al. | |
| 2003/0128053 | A1 | 7/2003 | Haigh et al. | |
| 2004/0207431 | A1 | 10/2004 | Haigh et al. | |
| 2006/0111043 | A1 * | 5/2006 | Wuidart | 455/41.1 |
| 2007/0289772 | A1 | 12/2007 | Kuroda et al. | |

FOREIGN PATENT DOCUMENTS

| JP | 2001-513276 A | 8/2001 |
|---|---|---|
| JP | 2003-523147 A | 7/2003 |
| JP | 2005-228981 A | 8/2005 |
| JP | 2008-023397 A | 2/2008 |
| WO | WO 2004/100473 A2 | 11/2004 |

OTHER PUBLICATIONS

Japanese Office Action for related Japanese Patent Application No. JP2008-216248, issued Jul. 11, 2013.

* cited by examiner

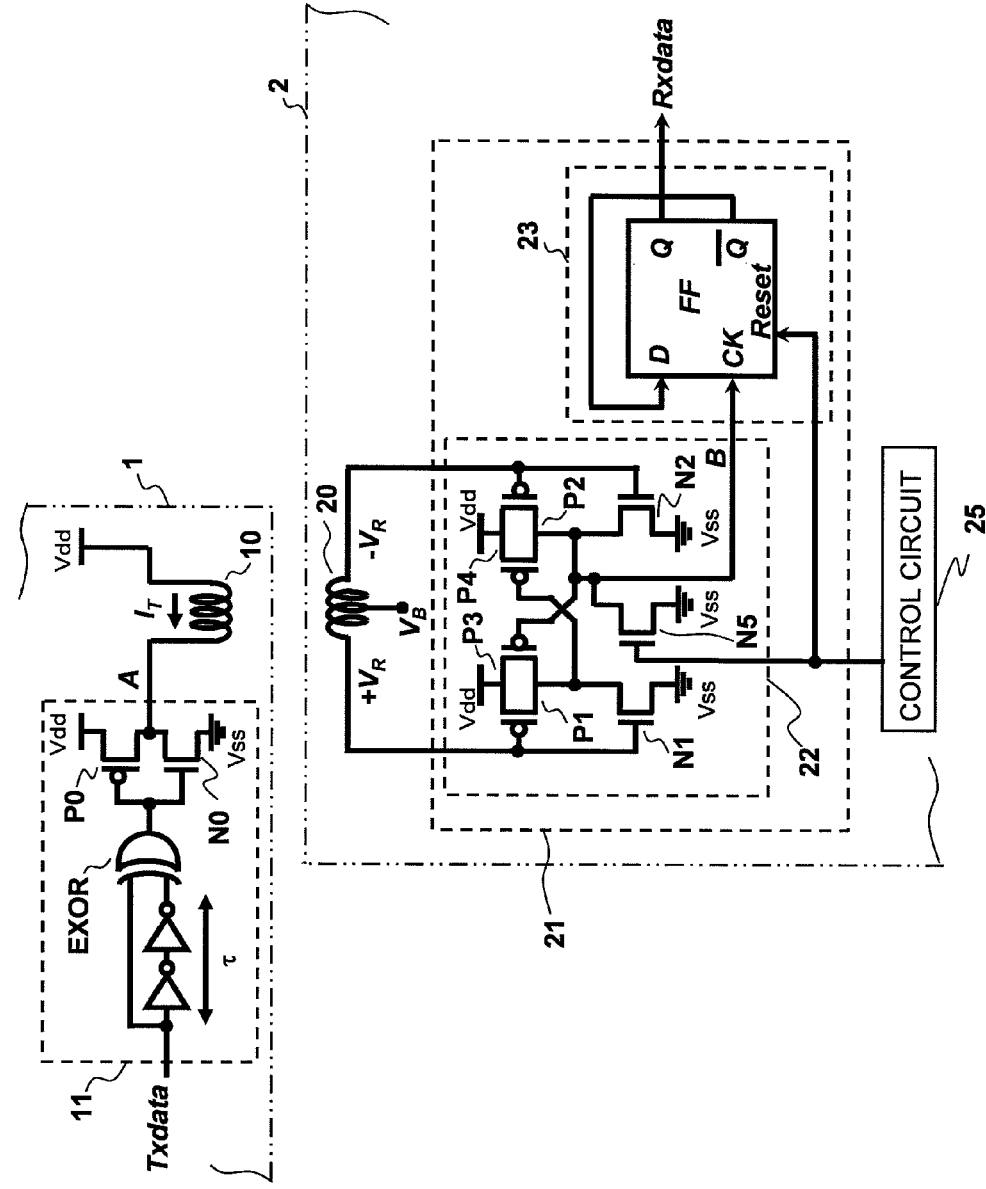

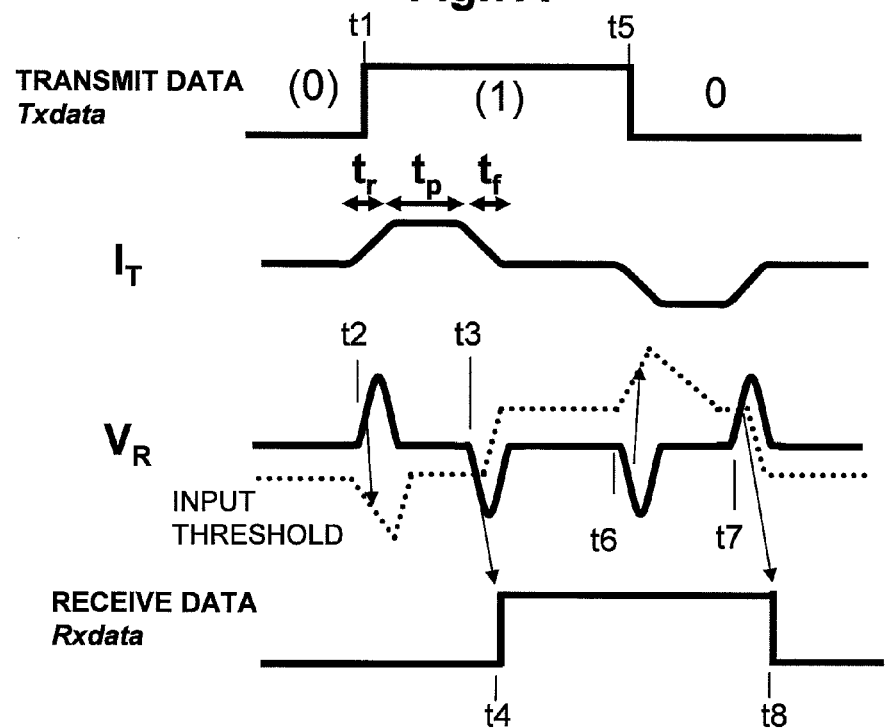
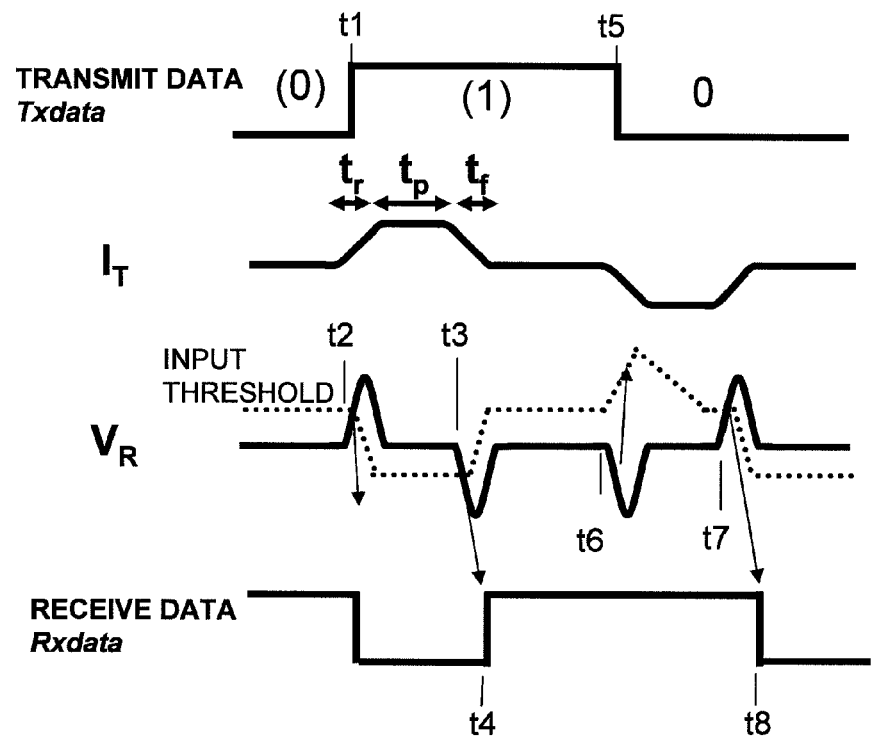

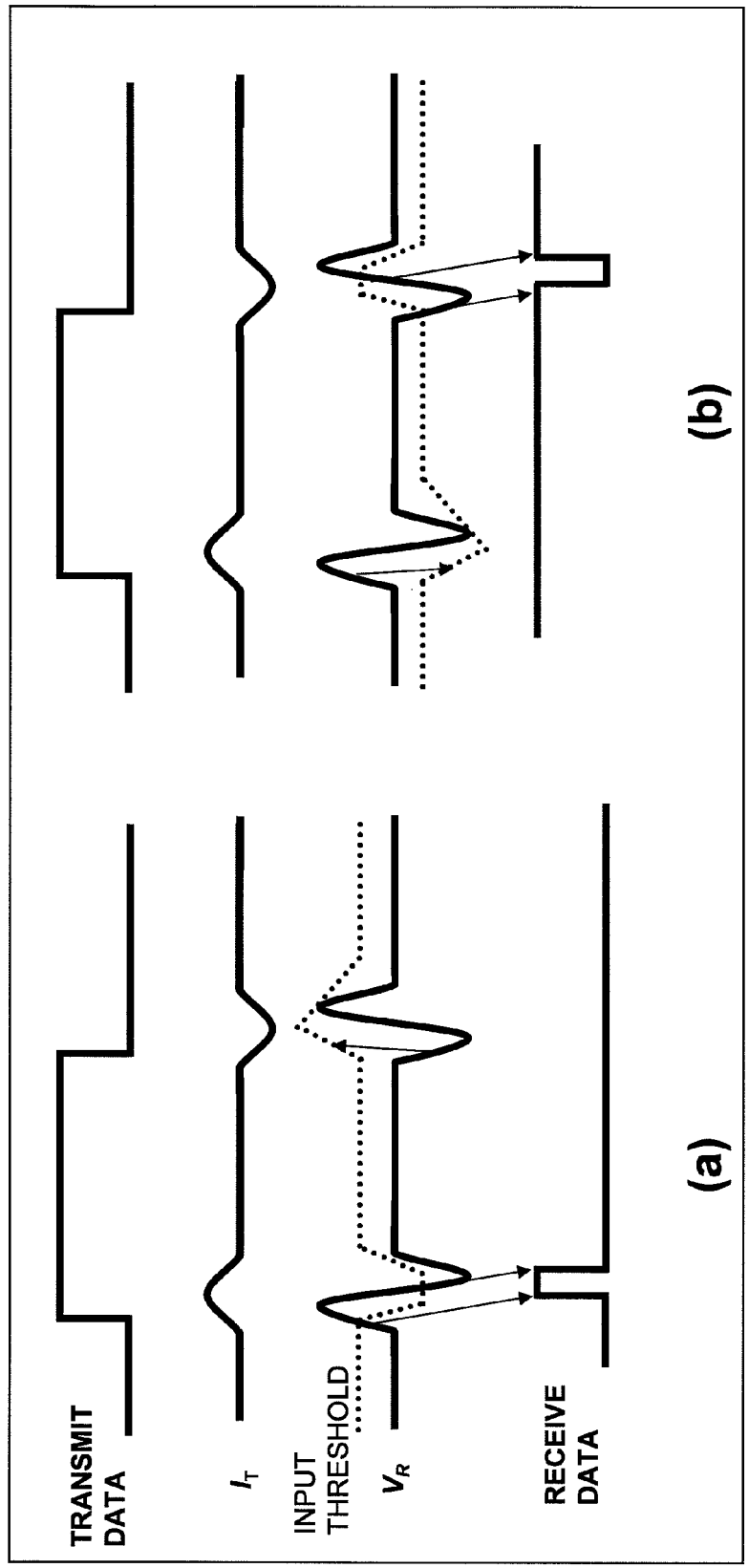

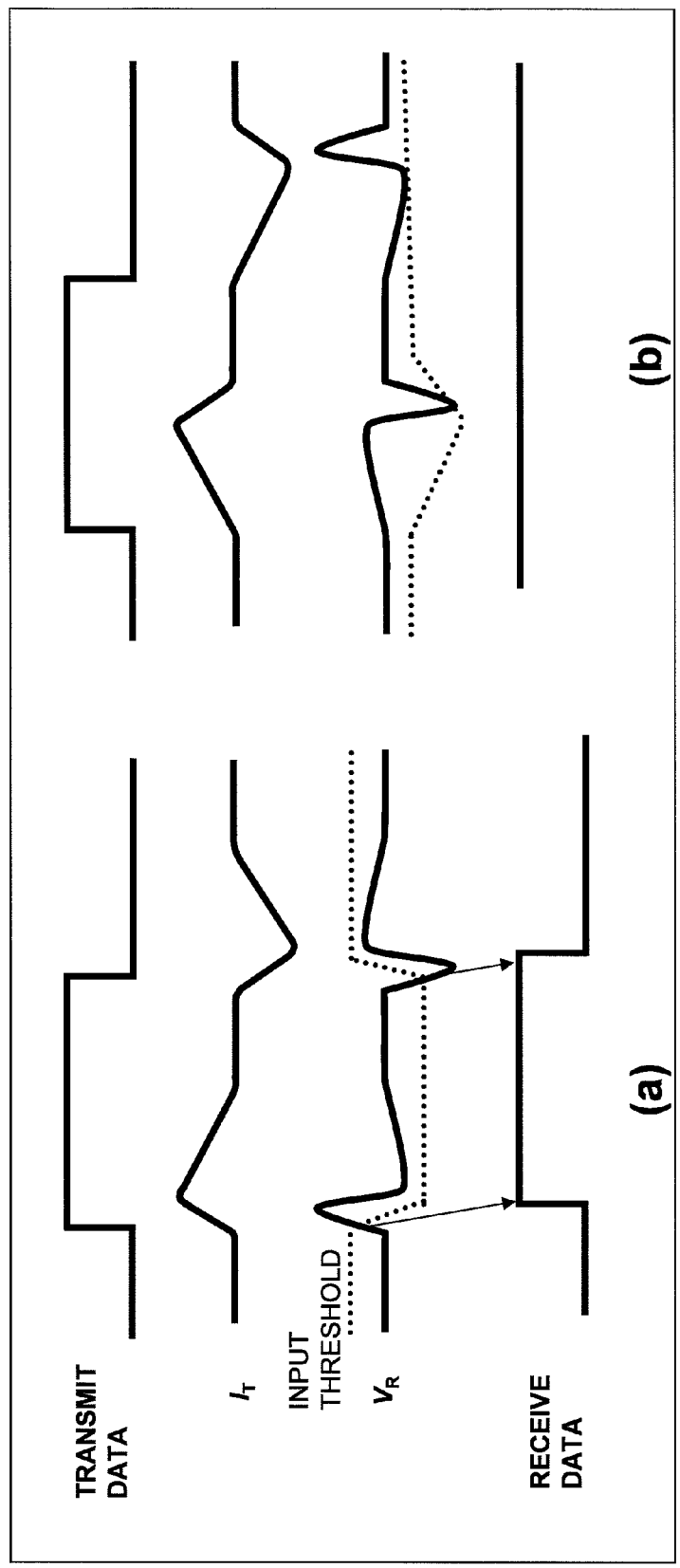

US 8,933,590 B2

ELECTRONIC CIRCUIT

TECHNICAL FIELD

The present invention relates to an electronic circuit to which non-contact proximity communication technology by means of inductive coupling of a coil is applied, especially to technology which is effective when applied to, for example, communication between chips, such as IC (Integrated Circuit) bare chips which are stacked for implementation, communication between printed circuit boards, and the like.

BACKGROUND ART

In Non-patent Document 1 and Patent Document 1 cited bellow, and others, the present inventors have proposed an electronic circuit which performs communication by means of inductive coupling between chips stacked for implementation or between adjacently arranged substrates, via coils formed by wiring on a chip of an LSI (Large Scale Integration) chip or wiring on a printed circuit board.

For example, as illustrated in FIG. 8, Patent Document 1 discloses technology in which a transmitter makes flow a current signal ($I_T$) of a pulse shape with a positive or a negative single polarity (henceforth called "single pulse") through a transmitting coil, and a receiver comprising a synchronous comparator detects and receives a signal of a pulse of a positive polarity or a negative polarity (that is, a pulse of the first half or the second half) of a pulse voltage signal ($V_R$) having a shape of double pulses with a positive polarity or a negative polarity (henceforth called "double pulse") which are generated in a receiving coil coupled inductively to the transmitting coil.

PATENT DOCUMENT (Patent Document 1) Japanese Patent Laid-open No. 2005-228981

NON-PATENT DOCUMENT (Non-patent Document 1) D. Mizoguchi et al, "A 1.2 Gb/s/pin Wireless Superconnect based on Inductive Inter-chip Signaling (IIS), "IEEE International Solid-State Circuits Conference (ISSCC'04), Dig. Tech. Papers, pp. 142-143, 517, February 2004.

DISCLOSURE OF THE INVENTION

Problems that the Invention is to Solve

Since the synchronous transmitting/receiving circuit described above employs a common clock (Txclk, Rxclk) for transmission and reception of data, a coil and a transmitting and receiving apparatus for sending the clock from the transmitting side to the receiving side are required, thereby causing increase of cost and electric power. It is also necessary to adjust timing of the clock (Rxclk) inputted into the receiver so that the receiver may operate at timing when a receive pulse signal becomes maximum in amplitude. In order to secure a margin of the timing, it is difficult to shorten the width of the transmit/receive pulse; accordingly, the data transfer rate is limited.

Therefore, in order to solve the above-described problem caused by the necessity of a clock in transmission and reception, the present inventors have examined a transmitting and receiving method based on an asynchronous system, and have filed a patent application on the technology (Japanese Patent Application No. 2008-023397). That is, as illustrated in FIG. 9, a transmitter makes a direct current signal ($I_T$) corresponding to transmit data flow through a transmitting coil, and a receiver comprising a hysteresis comparator detects asynchronously a voltage signal ($V_R$) of a single pulse induced in a receiving coil coupled inductively to the transmitting coil. In the above-described synchronous reception, it is sufficient for the receiver to operate only for a prescribed short time to receive the receive data. However, in the asynchronous reception, the receiver is always operated so as to be able to receive a signal at any time, leading to a high probability of malfunction due to a noise. Therefore, the asynchronous receiver is configured by a hysteresis comparator, in which a receive signal Rxdata is reversed when a receive pulse signal $V_R$ exceeds a fixed threshold, but not reversed by a noise smaller than the threshold. This input threshold changes corresponding to data which the hysteresis comparator outputs. A dotted line drawn in a $V_R$ waveform of FIG. 9 indicates the change of the input threshold. While the receive signal Rxdata outputs a "low" in an initial state, the input threshold is as high as +Vth. When a positive pulse is inputted into the input and exceeds the input threshold, the receive signal Rxdata is reversed to a "high", and the input threshold becomes as low as −Vth. The receive signal Rxdata is held at a "high" until a next negative pulse voltage exceeding the input threshold is inputted. Through the repetition described above, digital data can be correctly restored from a positive and a negative pulse voltage. For example, the hysteresis comparator comprises an amplifier circuit and a latch circuit. The amplifier circuit is configured by a CMOS inverter comprising a p-channel MOS transistor (simply described also as a "PMOS transistor") P1 and an n-channel MOS transistor (simply described also as an "NMOS transistor") N1 and a CMOS inverter comprising a PMOS transistor P2 and an NMOS transistor N2. The latch circuit is configured by cross coupling of a PMOS transistor P3 coupled to the PMOS transistor P1 in parallel and a PMOS transistor P4 coupled to the PMOS transistor P2 in parallel, more specifically, a gate of the PMOS transistor P3 and a gate of the PMOS transistor P4 are cross-coupled to the output terminals of the CMOS inverters. The latch circuit changes the threshold voltage of the inverter corresponding to data currently held. For example, in the state where the latch circuit latches a low level to Rxdata (a high level to /Rxdata), the sensitivity of the comparator is low to a level rise of $V_R$ and the threshold voltage of the comparator becomes high apparently. Once the latch data is reversed, the sensitivity of the comparator becomes low to a level fall of $V_R$ (a level rise of −$V_R$), and the threshold voltage of the comparator becomes low apparently. When the latch data is further reversed, the sensitivity of the comparator becomes low again to a level rise of $V_R$, and the threshold voltage of the comparator becomes high apparently.

However, this asynchronous transmitting/receiving circuit makes the direct current $I_T$ flow even when the transmit data does not change, causing a problem that power consumption is large. This fact is what has been found by the present inventors.

Therefore, the present inventors examined that, in order to decrease the power consumption of a transmitter, a current signal of a single pulse with rising or falling corresponding to the change of logical value of the transmit data is made to flow when the logical value changes. However, it was found that a voltage signal of a double pulse induced in a receiving coil can not be received by the hysteresis comparator. The reason is explained in the following. As illustrated in FIG. 10, corresponding to change of the transmit data, a signal $V_R$ of a double pulse is induced in the receiving coil. A dotted line drawn in the $V_R$ waveform diagram indicates change of the input threshold. When data on the watch is detected by the first half pulse of a double pulse signal (the first double pulse signal of (a) in FIG. 10 and the second double pulse signal of (b) in FIG. 10), the second half pulse, immediately after the first half pulse and having the reverse polarity, can also be detected, and the receive data as digital data can be obtained. Data transmitted next has a polarity opposite to that of the data transmitted currently (for example, when the current data changes from a "low" to a "high", the next data changes from a "high" to a "low"). Accordingly, the signal $V_R$ is a double pulse having a polarity reversed to positive or negative, to the opposite polarity as compared with the previous signal $V_R$. Therefore, the first half pulse is an input signal which departs from the input threshold, and the input threshold changes in the direction opposite to the input signal. Since it requires a predetermined time for the input threshold, which has changed to the opposite direction, to return to the original setting value, it is difficult to correctly receive the second half pulse following immediately after. Accordingly, the receive data does not change and the receive signal can not be reproduced. In the case of (b) in FIG. 10, it is difficult to reproduce data with respect to the first half double pulse signal $V_R$. In this way, when current flowing through the transmitting coil is changed from a direct current to a single-pulse current in order to reduce electric power of the transmitter, it is difficult to correctly receive data by the asynchronous receiver illustrated in FIG. 9.

Further consideration by the present inventors was given to the following modification. That is, like the pulse shape of transmitting current $I_T$ as illustrated in FIG. 11, a single pulse is deformed so as to exhibit an asymmetrical waveform before and after the peak. Accordingly, amplitude of the second half or the first half of a voltage signal of a double pulse induced in the receiving coil is suppressed low, and the receiver is rendered responsive only to a pulse in the first half or a pulse in the second half; consequently, transmission and reception are performed correctly. However, in the case of (a) in FIG. 11, it is necessary to set up a hysteresis band of the input threshold of the hysteresis comparator in excess as much as the amplitude of the second half pulse. Accordingly, power consumption of the hysteresis comparator increases and speed of response also falls. Since the second half pulse has a wider pulse width as compared with the first half pulse, the transmitting current increases and signal transmission speed falls. When the pulse shape is deformed so as to exhibit an asymmetry as illustrated in (b) of FIG. 11, opposite to (a) of FIG. 11 (that is, the first half pulse width is long and the second half pulse width is short), it becomes unnecessary to increase the hysteresis band of the input threshold of the hysteresis comparator. However, there remains a problem that the input threshold changes conversely by the input of the first half pulse, and it is likely that a malfunction occurs as illustrated in (b) of FIG. 11.

The present invention has been made in view of the above problems and provides a low-power high-speed asynchronous inductive-coupling transmission and reception technology, in which a current signal of a single pulse corresponding to transmit data is made to flow through a transmitting coil, and a voltage signal of a double pulse induced in an inductively-coupled receiving coil can be received asynchronously.

The above and other purposes and new features will become clear from description of the specification and the accompanying drawings of the present invention.

Means for Solving the Problems

The following explains briefly an outline of typical inventions to be disclosed by the present application.

(1) An electronic circuit according to the present invention comprises a transmitting circuit and a receiving circuit. The transmitting circuit transmits the fact that transmit data has had a change ("0" to "1" or "1" to "0", but both are not distinguished), by making a single pulse current of a single polarity flow through a transmitting coil (therefore, polarity information of the transmit data is not transmitted). The receiving circuit detects, by a comparator, a double pulse voltage signal induced in a receiving coil (for example, a positive pulse followed by a negative pulse, which are determined not by the polarity of the transmit data, but by the direction of the transmitting current and the manner of the inductive coupling), and outputs a single pulse signal of a single polarity (for example, a positive pulse, which is determined not by the polarity of the transmit data, but by the direction of the transmitting current and the manner of the inductive coupling). Accordingly, the receiving circuit detects the fact that receive data has had a change. This detection result is inputted into a sequential circuit as a frequency divider to restore the change of the transmit/receive data. Since only change of data is transmitted and received, it is necessary to decide in advance in transmission and reception that the beginning of data is "0" or "1." The threshold voltage of the comparator is initialized corresponding to the polarity of a receive double pulse voltage (a positive pulse followed by a negative pulse or a negative pulse followed by a positive pulse), irrespective of the polarity of the transmit/receive data. Even if the differential pair of the comparator is designed symmetrically, it is sometimes unable to secure which polarity the output voltage and the input threshold have immediately after powering on, due to device variation, etc. Accordingly, it is desirable to initialize the output of the comparator at the time of power-on reset, etc. Since the receiving circuit receives only the change of data transmitted, once an error occurs due to a noise, etc., errors continue to occur after that. Therefore, in order to avoid this situation, it is desirable to receive data by dividing the data into packets each having a fixed length for example, and to determine the beginning of data as "0" or "1" for each packet.

(2) According to another viewpoint, the transmitting circuit transmits the fact that transmit data has had a change ("0" to "1" or "1" to "0", and both are distinguished), by making a bipolar single pulse current flow through a transmitting coil, where the transmitting current pulse has a sufficiently expanded pulse width so that two single pulses may be received with a sufficient space, preventing the receive voltage signal from becoming a double pulse (therefore, the polarity information of the transmit data is also transmitted). At this time, the receiving circuit sets up the threshold voltage of the hysteresis comparator so as to restore the receive data, by detecting by the hysteresis comparator, not the first single pulse but the second single pulse of a pair of bipolar single pulse voltage signals induced in the receiving coil. (The pair of bipolar single pulse voltage signals are, for example, a positive pulse followed by a negative pulse or a negative pulse followed by a positive pulse, and the order of the polarity is decided by the polarity of the transmit data.) There are two methods in the setting. One method decides in advance that the first data is "1" or "0" in transmission and reception. For example, when it is decided that the first data is "0", the polarity of a double pulse received when a first "1" is transmitted and received is decided. Therefore, the threshold of the hysteresis comparator is set up so as to receive the second pulse. The other method transmits and receives the two-bit dummy data of "01" or "10", without setting the threshold of the hysteresis comparator. In this case, the threshold of the hysteresis comparator is automatically set up correctly so that transmission and reception of the subsequent data can be performed correctly.

Effects of the Invention

The following explains briefly an effect obtained by the typical inventions to be disclosed in the present application.

That is, it is possible to realize a low-power high-speed asynchronous inductive-coupling transmission and reception, in which a current signal of a single pulse corresponding to transmit data is made to flow through a transmitting coil, and a voltage signal of a double pulse induced in an inductively-coupled receiving coil can be received asynchronously.

BRIEF DESCRIPTION OF THE DRAWINGS

FIG. 1A is a block diagram illustrating a first embodiment of an electronic circuit according to the present invention;

FIG. 7A is an operating waveform chart in the case where, in the electronic circuit illustrated in FIG. 5, dummy data "0" and "1" are appended to the head of the transmit data and /Rxdata as the inverted output terminal of the hysteresis comparator 22A is not initialized, and the initial value of the inverted output terminal of the hysteresis comparator concerned is set as "1";

FIG. 7B is an operating waveform chart in the case where, in the electronic circuit illustrated in FIG. 5, dummy data "0" and "1" are appended to the head of the transmit data and /Rxdata as the inverted output terminal of the hysteresis comparator 22A is not initialized, and the initial value of the inverted output terminal of the hysteresis comparator 22A concerned is set as "0";

FIG. 10 is an explanatory diagram illustrating that a voltage signal of a double pulse induced in a receiving coil can not be received by a hysteresis comparator, as a result of modification applied to FIG. 9, in which, only when a logical value of the transmit data changes, a current signal corresponding to the change is made to flow in order to decrease power consumption of the transmitter; and FIG. 11 is an explanatory diagram illustrating that transmitting and receiving are performed correctly, as a result of further examination given to FIG. 9, in which a single pulse of a transmitting current $I_T$ is deformed so as to exhibit an asymmetrical waveform before and after the peak and amplitude of the second half of a voltage signal of a double pulse induced in the receiving coil is suppressed low.

BEST MODE FOR CARRYING OUT THE INVENTION

1. Summary of the Embodiments

Figure 1B:
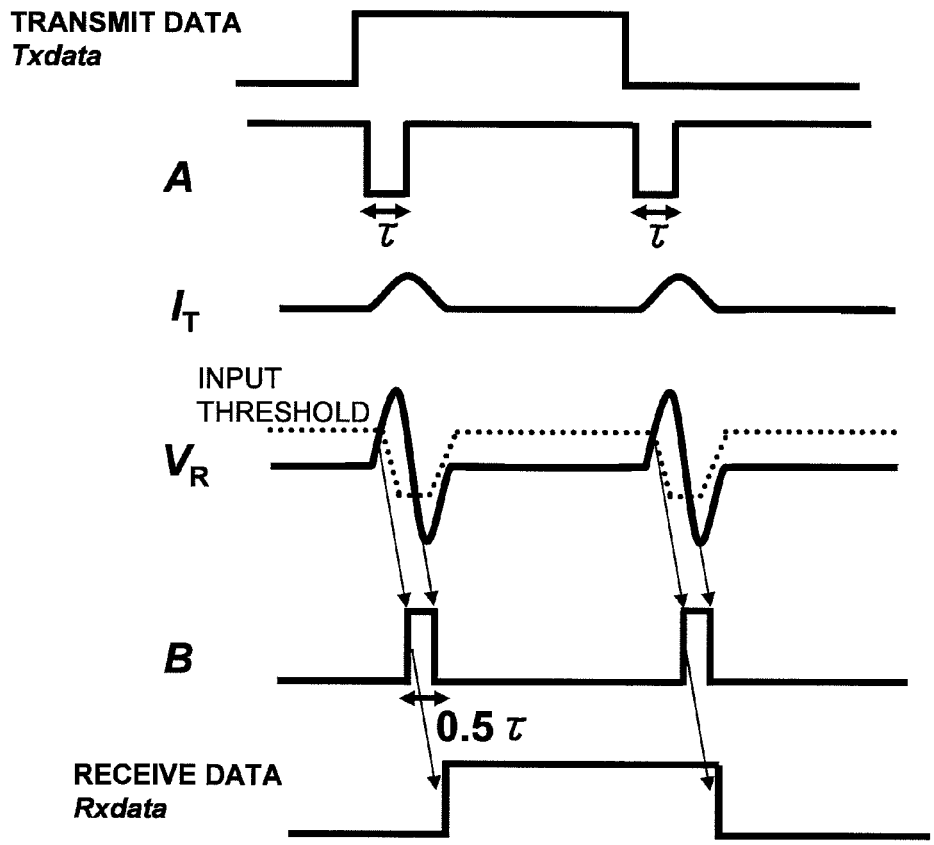
FIG. 1B is a waveform chart illustrating a normal transmission and reception operations of the electronic circuit illustrated in FIG. 1A.

First, a summary of typical embodiments of the invention disclosed in the present application is explained. A numerical symbol of the drawing referred to in parentheses in the outline explanation about the typical embodiment only illustrates what is included in the concept of the component to which the numerical symbol is attached.

<1> An electronic circuit according to the present invention comprises a first substrate (1) and a second substrate (2). The first substrate (1) comprises a first coil (10) and a transmitting circuit (11), the transmitting circuit being able to make a pulse current in a first direction flow through the first coil at each change of logical values of transmit data with a prearranged logical value in the head. The second substrate (2) comprises a second coil (20) coupled inductively to the first coil and a receiving circuit (21) connected to the second coil. The receiving circuit comprises a comparator (22) and a sequential circuit (23). The comparator (22) outputs a single pulse signal with a single polarity, by determining, with the use of a threshold voltage, an induced voltage ($V_R$) with a double pulse shape induced in the second coil by the pulse current in the first direction. The sequential circuit (23) inverts the output thereof whenever the single pulse signal is inputted.

Figure 8:
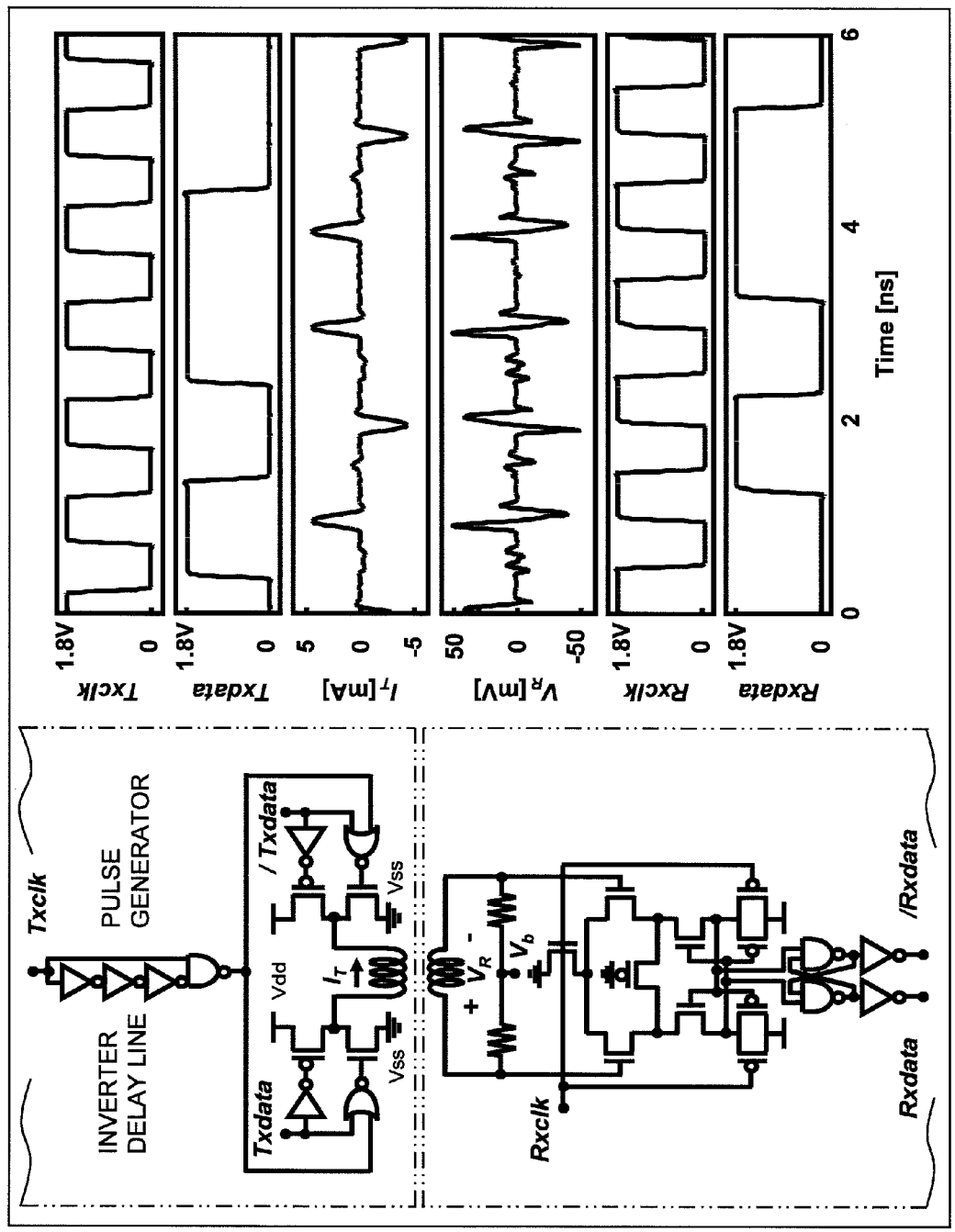
FIG. 8 is an explanatory diagram illustrating a receiver comprising a synchronous comparator described in Patent Document 1.
Figure 9:
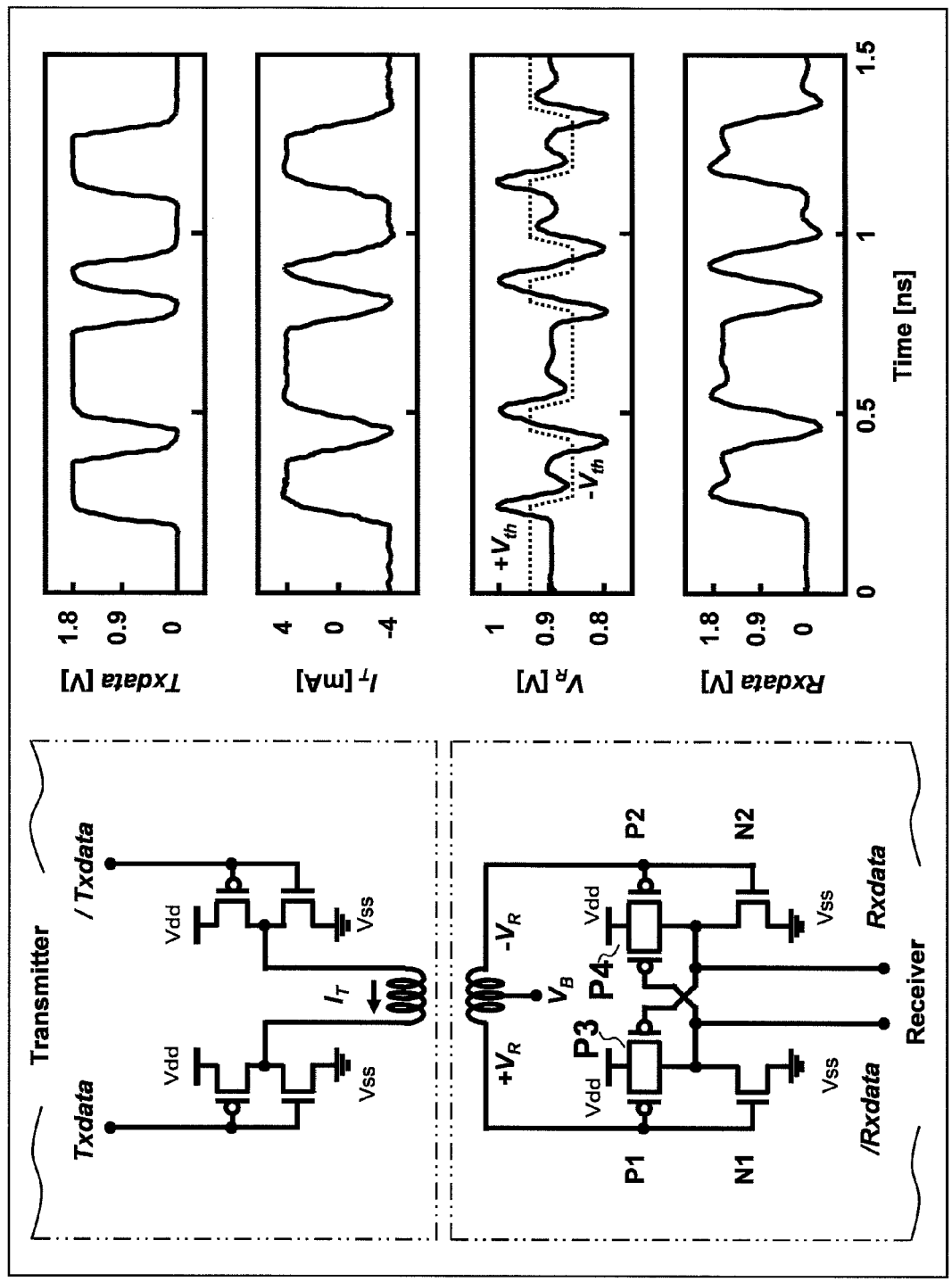
FIG. 9 is an explanatory diagram illustrating an invention examined in advance by the present inventors, in which asynchronous transmission and reception are performed.

According to the present configuration, since the pulse current is made to flow through the first coil at each change of a logical value of the transmit data, low power consumption of the transmitting circuit is realized, compared with a configuration in which current continues to flow always. Since the direction of current flowing through the first coil is fixed in the first direction, the double-pulse-shaped waveform of the induced voltage induced in the second coil of the receiving circuit is also fixed, and the comparator can not fail to detect change of an induced voltage waveform of a part of double pulses. Accordingly, it is possible to generate a digital single pulse signal at the output of the comparator at each change of the logical value of the transmit data. Reproduction of the receive data is enabled by inverting an output in the sequential circuit at each time when the single pulse signal concerned is inputted. Therefore, compared with the synchronous system illustrated in FIG. 8, transmission and reception of a clock become unnecessary, and the transmission/reception power can be reduced. Compared with the asynchronous system examined in advance as illustrated in FIG. 9, the transmission power can be reduced. A receiving error in the case of the single pulse transmission examined with reference to FIG. 10 does not occur. Compared with the case where the single pulse transmission waveform is changed slowly as illustrated in FIG. 11, it is possible to speed up the transmission and reception operations.

<2> In the electronic circuit according to Paragraph <1>, the comparator determines the induced voltage of the double pulse shape, based on a threshold voltage of an input with a hysteresis characteristic, and whenever the logical value of the output signal is reversed, the threshold voltage changes.

<3> In the electronic circuit according to Paragraph <2>, the comparator comprises an initialization transistor which switches the threshold voltage of the input to one of the two values for initialization.

<4> In the electronic circuit according to Paragraph <3>, the initialization transistor performs the switching for initialization, before the head of the receive data is received.

<5> In the electronic circuit according to Paragraph <3>, the initialization transistor performs the switching for initialization for every separation of the receive data.

<6> In the electronic circuit according to Paragraph <1>, the first substrate further comprises a third coil and a third-coil transmitting circuit. The third-coil transmitting circuit makes flow through the third coil, a pulse current in a different direction depending on the change of a logical value of the transmit data which has a prearranged logical value in the head. The second substrate further comprises a fourth coil inductively coupled to the third coil and a fourth-coil receiving circuit connected to the fourth coil. The third-coil transmitting circuit determines pulse width of the pulse current, and the pulse width is wide enough to shape an induced voltage induced in the fourth coil according to the rate of change of the pulse current, like a pair of single pulses with different polarities. The fourth-coil receiving circuit comprises a hysteresis comparator which determines the induced voltage with the shape of single pulses and outputs the determination result. According to the present configuration, the logical value of the first data is decided as a prearranged logical value of "1" or "0" in advance. Therefore, for example, when the prearranged logical value is decided as "0", the polarity of a double pulse to be received is decided when a first logical value "1" is transmitted and received, and the threshold of the hysteresis comparator is set up so as to receive the second pulse concerned. By the present initialization control, the receiving circuit can be set up so as to restore the receive data, by detecting by the hysteresis comparator, not the first single pulse but the second single pulse of a pair of bipolar single pulse voltage signals induced in the receiving coil. (The pair of bipolar single pulse voltage signals are, for example, a positive pulse followed by a negative pulse or a negative pulse followed by a positive pulse, and the order of the polarity is decided by the polarity of the transmit data) (Refer to FIG. 6A and FIG. 6B).

<7> In the electronic circuit according to Paragraph <1>, the first substrate further comprises a third coil and a third-coil transmitting circuit. The third-coil transmitting circuit makes flow, through the third coil, a pulse current of a different direction depending on the change of a logical value of the transmit data. The second substrate further comprises a fourth coil coupled inductively to the third coil, a fourth-coil receiving circuit connected to the fourth coil, and a control circuit which processes receive data received by the receiving circuit. The third-coil transmitting circuit determines the pulse width of the pulse current based on a delay time generated by a delay element, the pulse width being wide enough to shape an induced voltage induced in the fourth coil according to the rate of change of the pulse current, like a pair of single pulses with different polarities. The fourth-coil receiving circuit comprises a hysteresis comparator which determines the induced voltage with the shape of single pulses and outputs the determination result. The transmit data comprises 2-bit dummy data with different logical values in the head, and the control circuit ignores the two bits in the head of the receive data. Here, the two-bit dummy data of "01" or "10" are transmitted and received, without setting the threshold of the hysteresis comparator. In this case, in transmission and reception of data after the dummy data, the receiving circuit can be set up so as to restore the receive data, by detecting by the hysteresis comparator, not the first single pulse but the second single pulse of a pair of bipolar single pulse voltage signals induced in the receiving coil. In short, the threshold of the hysteresis comparator is automatically set up correctly so that transmission and reception of the subsequent data can be performed correctly (Refer to FIG. 7A and FIG. 7B).

2. Further Detailed Description of the Embodiments

The embodiments are explained in more detail. Hereinafter, the embodiments of the present invention will be explained in detail with reference to the accompanying drawings. In the entire diagrams for explaining the embodiments of the present invention, the same symbol is attached to a component which has the same function, and the repeated explanation thereof is omitted.

First Embodiment

FIG. 1A illustrates a first embodiment of an electronic circuit according to the present invention. FIG. 1B illustrates the operating waveform. The electronic circuit according to the present invention comprises a first semiconductor chip 1 and a second semiconductor chip 2 which are stacked, and has a function to perform proximity non-contact communication by means of inductive coupling between the two semiconductor chips. As a unit circuit for realizing the non-contact communication function, for example, the semiconductor chip 1 comprises a coil 10 and a transmitting circuit 11, and the semiconductor chip 2 comprises a coil 20 and a receiving circuit 21. Although not shown specifically, the above-described unit circuit is provided in a quantity equal to the number of parallel bits of transmit/receive data, plus one strobe signal for bit synchronization of the transmit/receive data. The strobe signal is a signal of which the logical value changes in synchronization with bits of the transmit/receive data. Therefore, by receiving a strobe signal and data, the second semiconductor chip recognizes a head of the receive data, and identifies the receive data in units of a bit.

The transmitting circuit 11 is configured by a circuit which detects a change of the transmit data Txdata and generates a pulse. For example, according to an exclusive OR signal of the transmit data Txdata and its delayed signal, the potential of one end of the coil 10 is driven by a CMOS inverter comprising a PMOS transistor P0 and an NMOS transistor N0, and current is drawn from the other end of the coil 10. That is, the transmitting circuit 11 performs transmission by making a single pulse current of a single polarity flow through the transmitting coil, when the transmit data changes from "0" to "1", or from "1" to "0." In this way, the transmitting circuit 11 transmits data, without distinguishing the change from "0" to "1" and the change from "1" to "0" of the transmit data. The transmitting circuit 11 does not transmit polarity information of the transmit data. More specifically, the transmitting circuit 11 inputs Txdata to two inputs of the exclusive OR gate (EXOR) after imparting a time difference of τ to the two inputs, and outputs a pulse signal having a time width of τ. As a result, the NMOS transistor N0 of the output stage turns on for a time of τ, and makes current $I_T$ flow in the coil. After that, the NMOS transistor N0 turns off, but the current $I_T$ continues to flow by the action of inductance of the coil 10 for some time, and then the current $I_T$ decreases to zero soon. The output stage of the transmitting circuit 11 may also be configured by only NMOS transistors. However, after the NMOS transistor turns off, potential and current of the coil 10 may resonate by the action of the inductance and parasitic capacitance of the coil 10, causing a trouble in transmission and reception. In this case, when the inverter circuit is configured by adding a PMOS transistor as illustrated in FIG. 1, no resonance takes place, since the PMOS transistor P0 turns on when the NMOS transistor N0 turns off. The channel width of the PMOS transistor P0 is preferably made small to such an extent that the coil does not cause resonance.

The receiving circuit 21 comprises a comparator, a hysteresis comparator 22 for example, to which both ends of the coil 20 are connected. In response to either a rising edge (at the time of change from a "low" to a "high") or a falling edge (at the time of change from a "high" to a "low") of an output signal of the hysteresis comparator 22, the receiving circuit 21 outputs receive data Rxdata via a D flip-flop (also described simply as a frequency divider) 23 acting as a sequential circuit which inverts the output. The hysteresis comparator 22 comprises an amplifier circuit and a latch circuit, for example. The amplifier circuit is configured by a CMOS inverter comprising a PMOS transistor P1 and an NMOS transistor N1 and a CMOS inverter comprising a PMOS transistor P2 and an NMOS transistor N2. The latch circuit is configured by cross coupling of a PMOS transistor P3 coupled to the PMOS transistor P1 in parallel and a PMOS transistor P4 coupled to the PMOS transistor P2 in parallel, more specifically, a gate of the PMOS transistor P3 and a gate of the PMOS transistor P4 are cross-coupled to the output terminals of the CMOS inverters. The latch circuit changes the threshold voltage of the inverter corresponding to data currently held. For example, when the latch circuit latches a signal B of a low level, by the current supply operation of the PMOS transistor P3, the output is not reversed if an inverting input, which is greater in absolute value than the logic threshold voltage of each CMOS inverter, is not inputted. Accordingly, the threshold voltage of the hysteresis comparator 22 becomes high apparently. Once the latch data is reversed, by the current supply operation of the PMOS transistor P4 this time, the output is not reversed if an inverting input, which is greater in absolute value than the logic threshold voltage of each CMOS inverter, is not inputted. Accordingly, the threshold voltage of the hysteresis comparator becomes low apparently. In this way, in the hysteresis comparator 22, the input threshold voltage changes whenever the logical value of the output signal B reverses. The hysteresis comparator 22 outputs the pulse signal B whenever the transmit data changes, as illustrated in FIG. 1B. A dotted line drawn in the waveform of the induced voltage $V_R$ indicates the threshold voltage of the hysteresis comparator 22. The width of the pulse signal B is about 0.5τ. The transmit data is restored by the frequency divider 23 outputting digital data which reverses alternately in synchronization with one of a rising edge or a falling edge of the pulse signal B.

Figure 3:
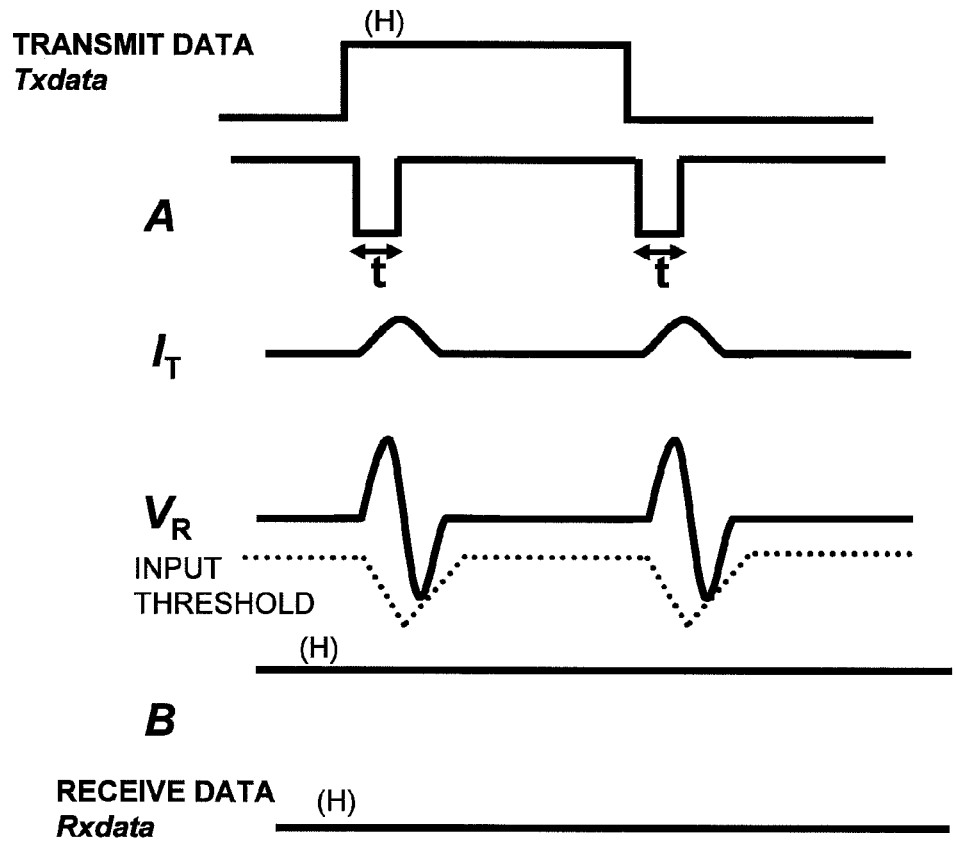
FIG. 3 is a waveform chart illustrating a state where a logical value of receive data becomes opposite to that of transmit data, in the case of a high level (a level of the power supply voltage VDD) which drives the direction of a first voltage change due to an induced voltage of a double pulse, to the direction departing from the threshold voltage of a hysteresis comparator 22.

As described above, in the receiving circuit 21, in response to a single pulse current, a double pulse voltage signal which is an induced voltage of a double pulse, for example, a positive pulse followed by a negative pulse, is induced in the receiving coil 20. This induced voltage signal is determined not by the polarity of the transmit data, but by the direction of the transmitting current and the manner of the inductive coupling. The hysteresis comparator 22 detects a double pulse voltage signal, and generates a single pulse signal B of a single polarity, for example, a positive pulse signal. However, since the signal B is determined not by the polarity of the transmit data, but by the direction of the transmitting current and the manner of the inductive coupling, the hysteresis comparator 22 outputs the signal B, only detecting the fact that the receive data has had a change. Since the receiving circuit receives only the change of data transmitted as described above, the receive data cannot be restored if it is not decided in advance in transmission and reception that the beginning of data is "0" or "1". The threshold voltage of the hysteresis comparator 22 is to be initialized corresponding to the polarity of a receive double pulse voltage (a positive pulse followed by a negative pulse or a negative pulse followed by a positive pulse), irrespective of the polarity of the transmit/receive data. Even if the differential stage of the hysteresis comparator 22 is designed symmetrically, it is sometimes unable to secure which polarity the output voltage and the input threshold of the hysteresis comparator 22 have immediately after powering on, due to device variation, etc. Therefore, as illustrated in FIG. 1A, the hysteresis comparator 22 adopts an NMOS transistor N5 as an initialization transistor for initializing a signal B of the output node selectively to a prearranged logical value "0" corresponding to the ground level (Vss), for example. In the configuration of FIG. 1A, the logical value for initialization satisfies a relation that the logical value (logical value "0") can reverse the output logical value of the hysteresis comparator 22 by a first half pulse of the induced voltage with a double pulse shape, as is clearly seen from FIG. 1B. As illustrated in a comparative example of FIG. 3, when the initial value of the hysteresis comparator 22 does not match with a prearranged logical value of the head data, contrary to the above, a logical value of the receive data becomes opposite to that of the transmit data; accordingly, it becomes impossible to restore the receive data.

The initializing operation of the hysteresis comparator 22 is performed by the control circuit 25 at the time of power-on reset, etc. Namely, in FIG. 1A, when "the prearranged logical value" is a logical value "0" in preparation for an input of the receive data of a logical value "1", before receiving the head data, the control circuit 25 once sets its output to a high level and then to a low level, thereby once turns on the NMOS transistor N5 and then turns off, and sets the input threshold voltage (a dotted line in $V_R$ of FIG. 1B) of the hysteresis comparator 22 to a positive value. Concurrently, it is necessary to set a value of the output data Rxdata of the flip-flop 23 to a logical value "0." Therefore, the output of the control circuit 25 is supplied also to a reset input terminal of the flip-flop 23. When the input signal is set to a high level, the flip-flop 23 is reset and the output data Rxdata is reset to a logical value "0."

In the scheme of the above-described transmission and reception, only change of data is transmitted and received; therefore, once an error occurs due to a noise, etc., errors continue to occur in the receive data after that. That is, since the same pulse is transmitted and received at every change of the transmit data (a change from a high level (a logical value "1") to a low level (a logical value "0") or from a low level to a high level), once an error occurs in the transmission and reception of the pulse, a high level and a low level of the receive data is reversed and the receive data remains to be erroneous until a next error occurs. Consequently, a bit error rate deteriorates to a great extent. In order to avoid such situations, the transmit/receive data is divided into packets, each having a fixed length. It is determined for each packet that the beginning of data is a logical value "0" or "1." Namely, it is sufficient that the head of each packet is set to a prearranged logical value, and that the initialization by the transistor N5 is performed at the head of each packet, or at the tail of each packet. The initialization control at this time for the hysteresis circuit 22 and the flip-flop 23 may be performed by the control circuit 25 similarly. Timing of the initializing operation may be supplied to the control circuit 25, in response to detection of packet separation performed by a receive data processing circuit (not shown).

Although not shown specifically, when the head data is determined as "1" contrary to the above, the output B of the hysteresis comparator 22 is initialized to a high level. In the present initialization, it is sufficient to precharge the output node B to the power supply voltage Vdd by a PMOS transistor. Same effect of deciding to resume the head data of a packet at a predetermined value is also obtained by deciding to end the final data of a packet at a predetermined value.

Figure 2A:
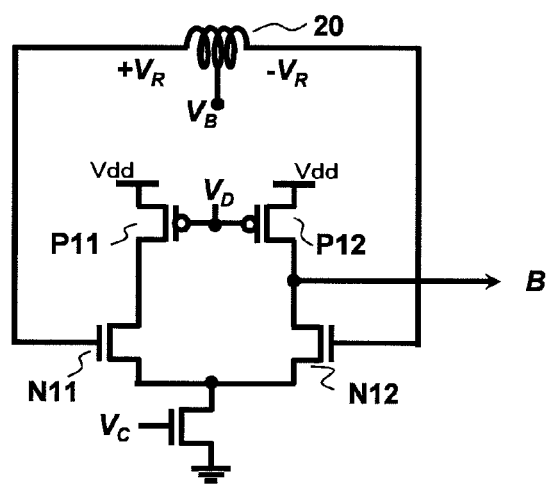
FIG. 2A is a circuit diagram illustrating another comparator circuit applicable to a receiving circuit.
Figure 2B:
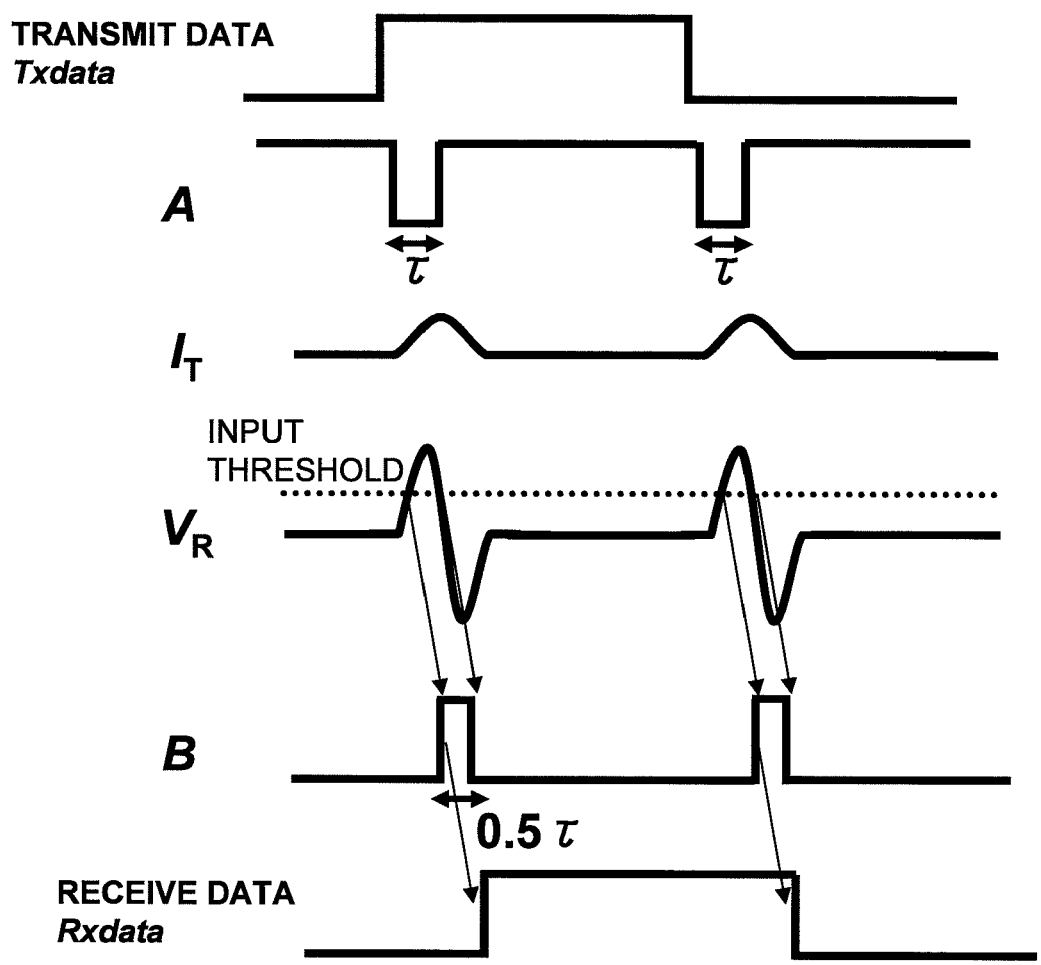
FIG. 2B is a waveform chart illustrating a normal transmission and reception operations when the comparator circuit illustrated in FIG. 2A is employed.

The hysteresis comparator 22 can be replaced with a comparator illustrated in FIG. 2A. The comparator illustrated in FIG. 2A determines plus or minus of a differential input by making equal the channel width of an NMOS transistor N11 and the channel width of an NMOS transistor N12, and also making equal the channel width of a PMOS transistor P11 and the channel width of a PMOS transistor P12. The input threshold voltage is set to zero, for example. If the channel width of the NMOS transistor N11 is made shorter than the channel width of the NMOS transistor N12, the output will be reversed at a point where the differential input exceeds a value of plus α. Accordingly, as illustrated in FIG. 2B, it is possible to set the input threshold voltage at a positive value. A dotted line drawn together with a waveform of $V_R$ in FIG. 2B indicates the threshold voltage.

Figure 4:
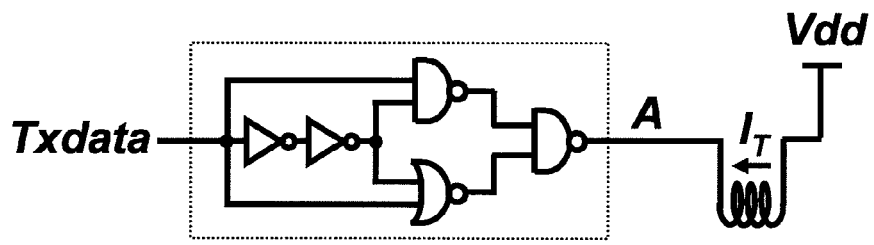
FIG. 4 is a logic block diagram illustrating another example of a transmitting circuit which detects an edge and generates a pulse.

FIG. 4 illustrates another example of a transmitting circuit 11 which detects an edge and generates a pulse. The present circuit makes current $I_T$ flow through the coil 10 at each change of a logical value of the transmit data, as is the case with FIG. 1.

In the electronic circuit according to Embodiment 1, since current flows through the transmitting coil 10 only for time τ, electric power in data transmission can be reduced. A typical value of τ is 200 ps. For example, when transmitting a 4-bit data stream "0110", at 100 Mbps, in an asynchronous system illustrated in FIG. 9, which makes flow a direct current, current $I_T$ flows through a transmitting coil for 10 ns×4=40 ns. A typical value of $I_T$ is 5 mA and a typical value of Vdd is 1.8V. Therefore, the transmission power is 1.8V×5 mA=9 mW. On the other hand, in the case of the present embodiment, a pulse current flows only for a period of 200 ps when the transmit data changes from "0" to "1" and from "1" to "0." Accordingly, the average current is 5 mA×(0.2 ns×2 pulses/40 ns)=0.05 mA, and the transmission power is 0.09 mW. Therefore, compared with the asynchronous system illustrated in FIG. 9, which makes a direct current flow, it is possible to decrease the transmission power to 0.09 mW/9 mW=0.01, that is 1%.

Second Embodiment

Figure 5:
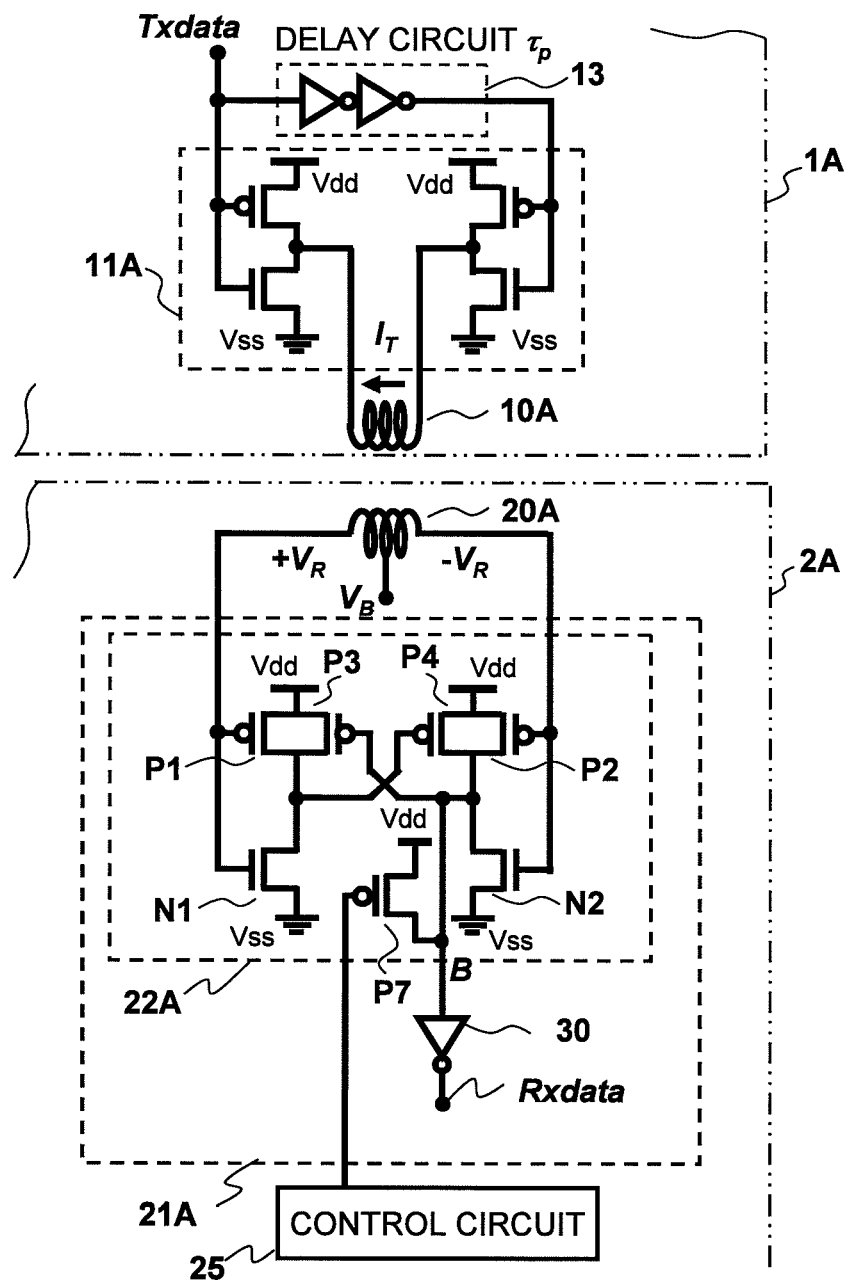
FIG. 5 is a block diagram illustrating a second embodiment of an electronic circuit according to the present invention.

FIG. 5 illustrates a second embodiment of an electronic circuit according to the present invention. The electronic circuit according to the present invention comprises a first semiconductor chip 1A and a second semiconductor chip 2A which are stacked, and has a function to perform proximity non-contact communication by means of inductive coupling between the two semiconductor chips. As a unit circuit for realizing the non-contact communication function, for example, the semiconductor chip 1A comprises a coil 10A and a transmitting circuit 11A, and the semiconductor chip 2A comprises a coil 20A and a receiving circuit 21A. Although not shown specifically, the above-described unit circuit is provided in a quantity equal to the number of parallel bits of transmit/receive data, plus one for a strobe signal for bit synchronization of the transmit/receive data. The strobe signal is a signal of which the logical value changes in synchronization with a bit of the transmit/receive data. Therefore, by receiving a strobe signal and data, the second semiconductor chip recognizes a head of the receive data, and identifies the receive data in units of a bit.

The transmitting circuit 11A comprises a pair of CMOS inverters which drive both ends of the coil complementarily. Transmit data Txdata is supplied to one inverter, and a delayed signal of the transmit data Txdata is supplied to the other inverter. Accordingly, pulse current flows through the coil 10A, in the direction defined by a logical value of the transmit data and for a period proportional to the delay time. That is, the transmitting circuit 11A determines the pulse width of the pulse current $I_T$ based on the delay time τp generated by the delay element 13. The pulse width is wide enough to shape an induced voltage $V_R$ induced in the coil 20A according to the rate of change of the pulse current, like a pair of single pulses with different polarities. The receiving circuit 21A comprises a hysteresis comparator 22A which determines an induced voltage $V_R$ of the single pulse shape using a threshold voltage and outputs the result. The hysteresis comparator 22A for example is configured in analogy with the hysteresis comparator 22 illustrated in FIG. 1, and /Rxdata for example is an output node of the hysteresis comparator 22A, or receive data. Here, in order to initialize the output node B of the hysteresis comparator 22A, a PMOS transistor P7 which pulls up the node B concerned selectively is provided. Switch control of the PMOS transistor P7 is performed by power-on reset, etc., by the controller 25, as is the case with the above. A signal at the node B is inverted by an inverter 30, and the inverted output serves as the receive data Rxdata. The reason for defining the output of the inverter as the receive data Rxdata (the reason for equating the logic value of the node B to /Rxdata) comes from consideration of the fact that a pulse in the second half of a bipolar pulse is received, and that the pulse of the second half is an inverted logic value of the transmit data.

Figure 6A:
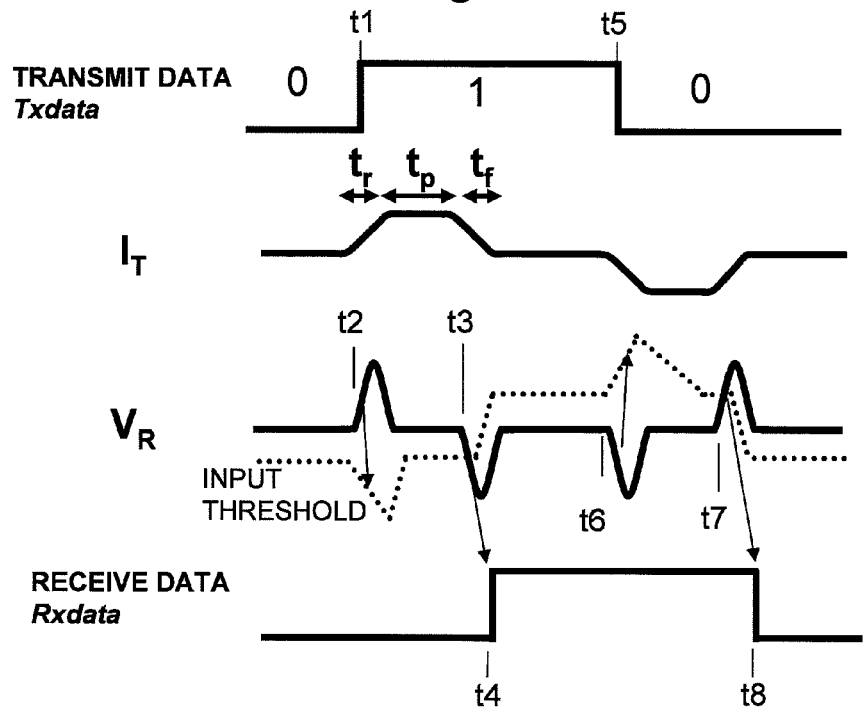
FIG. 6A is an operating waveform chart in the case where, in the electronic circuit illustrated in FIG. 5, the head of transmit data is set as a logical value "0" and an initial value of /Rxdata as an inverted output terminal of the hysteresis comparator 22A is set as a logical value "1"

The transmitting circuit 11A generates a single pulse current $I_T$ of bipolar to flow through a transmitting coil, by distinguishing a change of the transmit data from "0" to "1", and a change from "1" to "0." A transmitting current pulse width is determined so that a receive voltage signal is received as two single pulses with a sufficient interval, not as a conjoined double pulse. As represented by FIG. 6A, for example, owing to a time interval of τp placed between a rising and a falling of the pulse current $I_T$, it is possible to obtain an induced voltage $V_R$ of a pair of single pulses with bipolar (two single pulses with different polarities) from one pulse current $I_T$. When a typical value of τr and τf is 100 ps, a typical value of τp is 300 ps. The value of τp is the delay time of the delayed signal for Txdata, and the delay time may be determined by increasing or decreasing the number of gate stages, such as the inverters illustrated in FIG. 5, or by changing the channel width, etc. of a transistor.

In the second embodiment, a pair of bipolar single pulse voltage signal $V_R$, induced in the receiving coil 20A, is given by a combination of a positive pulse and a negative pulse or a combination of a negative pulse and a positive pulse, and the order of the polarity is decided by the polarity of the transmit data. In the present case, the receiving circuit 21A can restore the receive data, by detecting by the hysteresis comparator 22A not the first single pulse but the second single pulse of a pair of bipolar single pulse voltage signal $V_g$ induced in the receiving coil 20A. For that purpose, it is necessary to initialize the threshold voltage of the hysteresis comparator 22A. A first method and a second method for initialization are disclosed here.

Figure 6B:
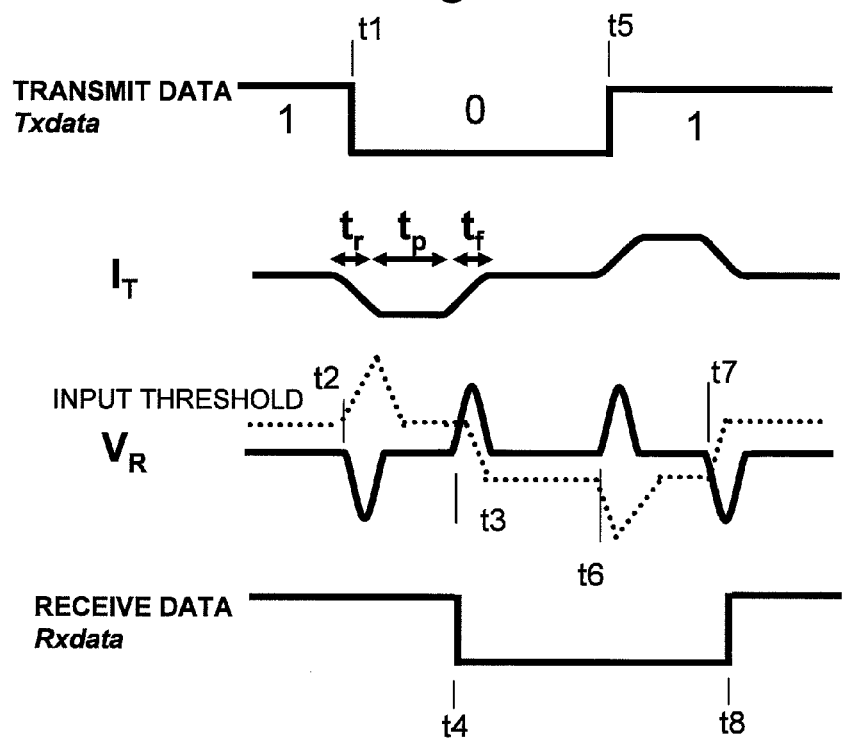
FIG. 6B is an operating waveform chart in the case where, in the electronic circuit illustrated in FIG. 5, the head of transmit data is set as a logical value "1" and an initial value of /Rxdata as an inverted output terminal of the hysteresis comparator 22A is set as a logical value "0"

The first method decides that the first data is "1" or "0" in transmission and reception in advance. For example, when it is decided that the first data is "0", the polarity of a double pulse received when a first "1" is transmitted and received is decided. Therefore, the threshold of the hysteresis comparator 22A is initialized to a logical value with which the second pulse can be received. For example, FIG. 6A illustrates an example in the case where the head of the transmit data is set as a logical value "0" and the initial value of the output node B of the hysteresis comparator 22A is set as a logical value "1", that is, the case where the initial value of the receive data Rxdata is set as a logical value "0." FIG. 6B illustrates an example of the case where the head of the transmit data is set as a logical value "1" and the initial value of /Rxdata, which is an inverted output terminal of the hysteresis comparator 22A, is set as a logical value "0." In either case, for the change of the transmit data at time t1 and time t5, the receive data /Rxdata changes at time t4 and time t8, in response to the induced voltage $V_R$ of the second single pulses at time t3 and time t7, respectively. Accordingly, the receive data can be reproduced normally. In the case of FIG. 6B, although not shown specifically, an NMOS transistor is adopted in place of the PMOS transistor P7.

The second method performs transmission and reception by appending a 2-bit dummy data of "01" or "10" at the head of the transmit data, without initializing the threshold of the hysteresis comparator correctly. By this scheme, in transmission and reception operations of data after the dummy data, the threshold of the hysteresis comparator 22A is automatically set up correctly; accordingly, it is possible to perform the receiving operation correctly. For example, FIG. 7A and FIG. 7B illustrate examples of the case where dummy data "01" is appended to the head of the transmit data, and no initialization is performed for /Rxdata which is an inverted output terminal of the hysteresis comparator 22A. In short, FIG. 7A and FIG. 7B illustrate examples of the case where the initial value of the inverted output terminal of the hysteresis comparator 22A is undefined as "1" or "0". FIG. 7A illustrates the case where the initial value of the inverted output terminal of the hysteresis comparator 22A is set as "1", and FIG. 7B illustrates the case where the initial value of the inverted output terminal of the hysteresis comparator 22A is set as "0". In either case, according to the change of the dummy data at time t1, in response to the change (at time t3) of a pulse in the second half of the double pulses formed at time t2 and time t3, the threshold in the inverted output terminal /Rxdata of the hysteresis comparator 22A and a proper logical value state of the output data are decided, and it becomes possible to perform the subsequent receiving operation properly. A microcomputer 25 can recognize the receive data using the strobe signal. When the second method is applied to the strobe signal, another means to recognize a head of the strobe signal must be added. Although not shown specifically, the PMOS transistor P7 is not necessary in the case of FIG. 7B.

As described above, the invention accomplished by the present inventors has been concretely explained based on various embodiments. However, it cannot be overemphasized that the present invention is not restricted to the embodiments, and it can be changed variously in the range which does not deviate from the gist.

The hysteresis comparator and the sequential circuit are not limited to the above-described configuration, but can be changed suitably. The circuit of the present invention is not limited to an MOS integrated circuit, but can be changed to a circuit which uses bipolar transistors. It is also preferable to fabricate together the configuration of FIG. 1A and the configuration of FIG. 5 in each semiconductor chip for non-contact communication. In FIG. 1A, it is possible to supply to the D flip-flop 23 an output of a node of the opposite polarity of the node B. In FIG. 5, it is also possible to employ an output node of the opposite side as the output. The above explanation is made in terms of the positive logic in which a logical value "1" is a high level. However, the present invention is not limited to the case, but the negative logic can be applied as well. The present invention is not limited to communication between semiconductor chips, but can be applied also to communication between circuits mounted in a flexible substrate and communication between a circuit mounted in a flexible substrate and a semiconductor chip. A substrate as used in the present invention means a semiconductor chip and a flexible substrate. When performing two-way communications, each substrate should just mount a transmitting circuit and a receiving circuit.

INDUSTRIAL APPLICABILITY

The present invention is widely applicable to an electronic circuit which adopts non-contact proximity communication technology by means of inductive coupling of a coil, communication between chips, such as IC (Integrated Circuit) bare chips stacked for implementation, and furthermore to communication between printed circuit boards, etc.

What is claimed is:

1. An electronic circuit comprising:
   a first substrate comprising a first coil and a transmitting circuit for causing a pulse current in a first direction to flow through the first coil at each change of logical values of transmit data, a prearranged logical value being located in a head of each packet of transmit data; and
   a second substrate comprising a second coil coupled inductively to the first coil, a receiving circuit connected to the second coil, and a control circuit connected the receiving circuit,
   wherein the receiving circuit comprises:
      a comparator, including an initialization transistor and an output node, for outputting a single pulse signal with a single polarity, by determining, with the use of a threshold voltage, an induced voltage with a double pulse shape induced in the second coil by the pulse current in the first direction; and
      a sequential circuit, coupled to the output node, for inverting the output whenever the single pulse signal is inputted,
   wherein the initialization transistor initializes the output node to a prearranged logical value during an initialization operation, and
   wherein the control circuit performs the initialization operation at the head of each data packet.

2. The electronic circuit according to claim 1,
   wherein the comparator determines the induced voltage of the double pulse shape based on a threshold voltage of an input with a hysteresis characteristic, and whenever the logical value of the output signal is reversed, the threshold voltage changes.

3. The electronic circuit according to claim 2, wherein the control circuit initializes the threshold voltage of the input of the comparator to one of two values during the initialization operation.

4. The electronic circuit according to claim 3, wherein the transmitting circuit comprises:
 a delay circuit for delaying the transmit data;
 an exclusive OR gate including an input for the transmit data, an input for the delayed transmit data, and an output for a pulse signal; and
 a driver for causing the pulse current in the first direction to flow through the first coil based on the pulse signal of the exclusive OR gate, and for stopping the flow of the pulse current in the first direction through the coil.

5. The electronic circuit according to claim 3, wherein the comparator comprises:
 a first CMOS inverter having an input connected to one end of the second coil, and an output;
 a second CMOS inverter having an input connected to another end of the second coil, and an output coupled to the output node;
 a first latching PMOS transistor, coupled to a PMOS transistor of the first CMOS inverter in parallel, having a gate coupled to the output of the second CMOS inverter; and
 a second latching PMOS transistor, coupled to a PMOS transistor of the second CMOS inverter in parallel, having a gate coupled to the output of the first CMOS inverter,
 wherein the initialization transistor is a MOS transistor, coupled to the output of the second CMOS inverter, having a gate coupled to the control circuit.

6. An electronic circuit, comprising:
 a first substrate comprising a first coil and a transmitting circuit for causing a pulse current in a first direction to flow through the first coil at each change of logical values of transmit data, a prearranged logical value being located in a head of each packet of transmit data; and
 a second substrate comprising a second coil coupled inductively to the first coil, a receiving circuit connected to the second coil, and a control circuit connected the receiving circuit,
 wherein the receiving circuit comprises:
  a comparator, including an initialization transistor and an output node, for outputting a single pulse signal with a single polarity, by determining, with the use of a threshold voltage, an induced voltage with a double pulse shape induced in the second coil by the pulse current in the first direction; and
  a sequential circuit, coupled to the output node, for inverting the output whenever the single pulse signal is inputted,
 wherein the first substrate further comprises a third coil and a third-coil transmitting circuit for causing to flow, through the third coil, a pulse current in a different direction depending on the change of a logical value of the transmit data,
 wherein the second substrate further comprises a fourth coil coupled inductively to the third coil and a fourth-coil receiving circuit connected to the fourth coil,
 wherein the third-coil transmitting circuit determines pulse width of the pulse current,
 wherein the pulse width is made wide enough to shape an induced voltage induced in the fourth coil according to the rate of change of the pulse current, like a pair of single pulses with different polarities, and
 wherein the fourth-coil receiving circuit comprises a hysteresis comparator determining the induced voltage with the shape of single pulses and outputting the determination result.

7. An electronic circuit, comprising:
 a first substrate comprising a first coil and a transmitting circuit for causing a pulse current in a first direction to flow through the first coil at each change of logical values of first transmit data, a prearranged logical value being located in a head of each packet of first transmit data; and
 a second substrate comprising a second coil coupled inductively to the first coil, a receiving circuit connected to the second coil, and a control circuit connected the receiving circuit,
 wherein the receiving circuit comprises:
  a comparator, including an initialization transistor and an output node, for outputting a single pulse signal with a single polarity, by determining, with the use of a threshold voltage, an induced voltage with a double pulse shape induced in the second coil by the pulse current in the first direction; and
  a sequential circuit, coupled to the output node, for inverting the output whenever the single pulse signal is inputted,
 wherein the first substrate further comprises a third coil and a third-coil transmitting circuit for causing to flow, through the third coil, a pulse current of a different direction depending on the change of a logical value of second transmit data,
 wherein the second substrate further comprises a fourth coil coupled inductively to the third coil, a fourth-coil receiving circuit connected to the fourth coil, and a control circuit processing receive data received by the receiving circuit,
 wherein the third-coil transmitting circuit determines the pulse width of the pulse current based on a delay time generated by a delay element,
 wherein the pulse width is made wide enough to shape an induced voltage induced in the fourth coil according to the rate of change of the pulse current, like a pair of single pulses with different polarities,
 wherein the fourth-coil receiving circuit comprises a hysteresis comparator determining the induced voltage with the shape of single pulses and outputting the determination result,
 wherein the second transmit data comprises 2-bit dummy data with different logical values in a head of each data packet, and
 wherein the control circuit ignores the two bits in the head of each packet of the receive data.

* * * * *